United States Patent

[11] 3,535,996

[72] Inventors: Alfred Winkler, Munich;
Karl Bammesberger, Munich-Untermenzing, and Johann Zanner, Unterhaching, Germany
[21] Appl. No. 704,010
[22] Filed Feb. 8, 1968
[45] Patented Oct. 27, 1970
[73] Assignee Agfa-Gevaert Aktiengesellschaft Leverkusen, Germany
[32] Priority Feb. 15, 1967
[33] Germany
[31] A 27,218

[54] RECEPTACLE FOR BATTERIES OR THE LIKE
13 Claims, 4 Drawing Figs.
[52] U.S. Cl. .................................................. 95/86, 136/173, 206/1
[51] Int. Cl. .................................................. G03b 17/56
[50] Field of Search .................................. 95/86; 240/10.65, 10.66; 206/1, 17, 45.15, 45.18; 136/173

[56] References Cited
UNITED STATES PATENTS
| | | | |
|---|---|---|---|
| 1,064,370 | 6/1913 | Patterson | 136/173.1 |
| 1,403,707 | 1/1922 | Quarnstoom | 136/173 |
| 2,589,071 | 3/1952 | Galasso | 136/173.12 |
| 2,964,166 | 12/1960 | Lehner | 206/1 |
| 3,301,627 | 1/1967 | Kimura | 95/86X |
| 3,456,102 | 7/1969 | Brindley | 240/10.65X |

Primary Examiner—John M. Horan
Assistant Examiner—Fred L. Braun
Attorney—Michael S. Striker ABSTRACT: A receptacle for a stack of cylindrical batteries includes a housing which forms part of the pistol grip in a motion picture camera. A springy holder has a base which is coupled to a pivot in the housing and is movable between an inserted position in which it lies flat against the bottom wall of the housing and an exposed position in which the batteries can be readily withdrawn from a compartment. The compartment is located between two elastic clamping members which are rigid with the base and portions of which extend from the housing in inserted position of the holder to facilitate the latter's pivotal movement to exposed position. Portions of the clamping members are in frictional engagement with the side walls of the housing, at least in inserted position of the holder.

Patented Oct. 27, 1970
3,535,996
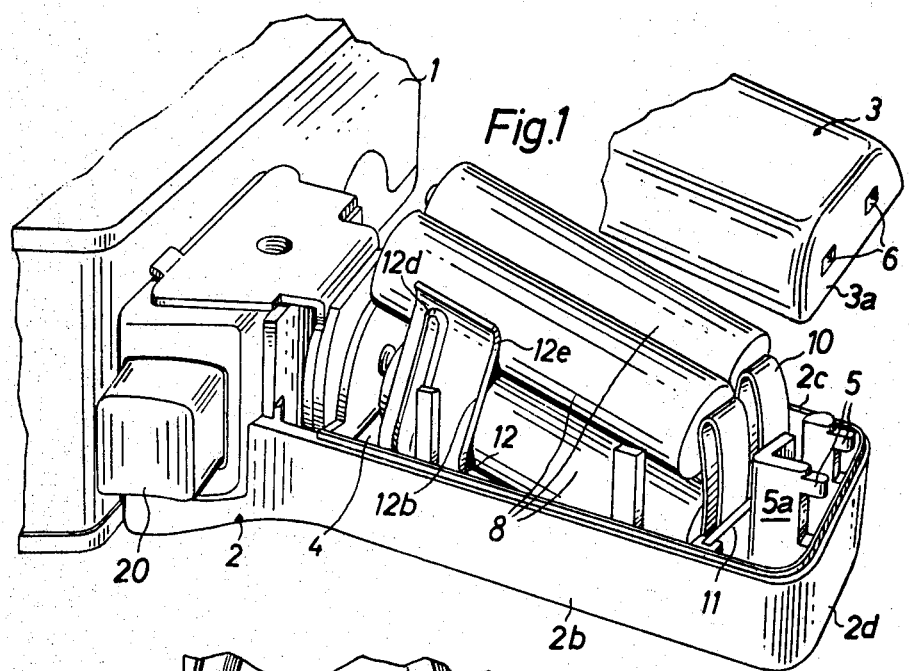
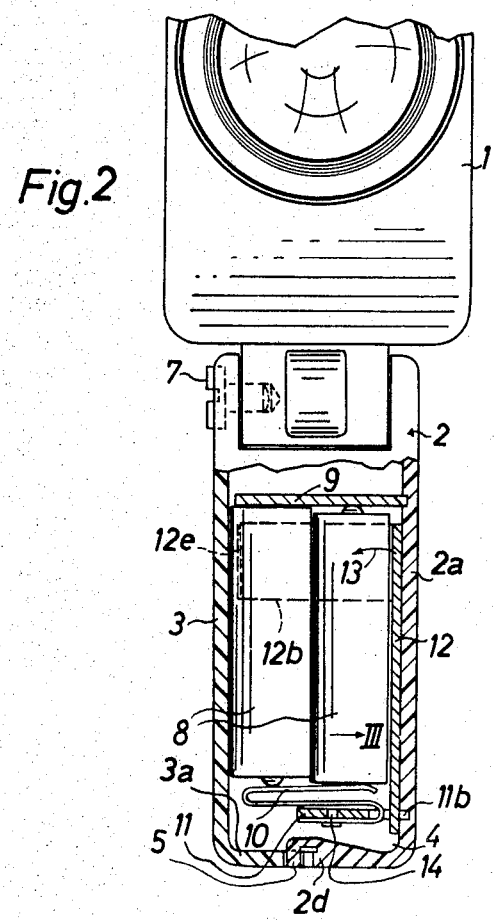
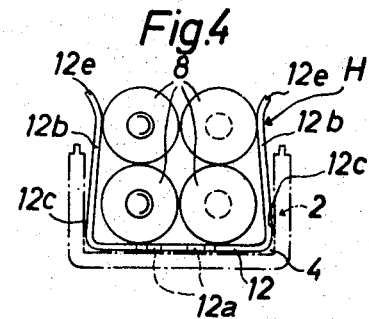
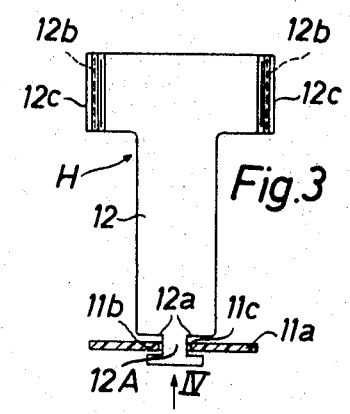
INVENTORS
ALFRED WINKLER
KARL BAMMESBERGER
JOHANN ZANNER
BY Michael S. Strcher
Attorney 3,535,996

RECEPTACLE FOR BATTERIES OR THE LIKE

BACKGROUND OF THE INVENTION

The present invention relates to receptacles or containers for cylindrical electric dry cells (hereinafter called batteries for short) or like substantially rod-shaped articles. More particularly, the invention relates to improvements in receptacles which are particularly suited to accommodate one or more batteries in motion picture cameras, especially in 8-millimeter motion picture cameras.

In conventional motion picture cameras wherein the shutter and film transporting mechanism are driven by an electric motor, the batteries are normally held by clamps which are fixed to the housing of the camera. Such clamps consist of springy material to hold the batteries in proper contact with electric terminals but they are not entirely satisfactory because it is rather difficult to remove batteries from the camera body.

SUMMARY OF THE INVENTION

It is an object of our invention to provide a novel and improved receptacle or container for one or more batteries or like substantially rod-shaped articles wherein the articles are properly held when in use but can be readily moved to positions in which they can be detached from their holder to facilitate rapid interchange or replacement which is particularly important in motion picture cameras.

Another object of the invention is to provide a receptacle of the just outlined character which can be designed to accommodate one or more substantially rod-shaped articles, which occupies little room, and which consists of a small number of simple and inexpensive parts.

A further object of the invention is to provide a receptacle which can form part of a motion picture camera and which, in addition to accommodating one or more removable cylindrical dry cells or the like, can also serve one or more additional functions, for example, by constituting a pistol grip or a similar handle or handgrip portion of the camera.

An additional object of the invention is to provide a receptacle which is of lightweight construction and which can be designed to receive one or more commercially available batteries.

The improved receptacle comprises a housing having an open side and a chamber extending inwardly from such open side, pivot means provided in the housing, and a holder including a base one end portion of which is turnably coupled to the pivot means to permit movements of the holder between an inserted position in which the base is accommodated in the housing and an extended or exposed position, and a pair of clamping members rigid with the base and defining between themselves a compartment for one or more rod-shaped articles. At least one of the clamping members consists of elastomeric material so that it can engage and yieldably hold the article or articles in the compartment. A portion of at least one clamping member preferably extends from the chamber in inserted position of the holder to facilitate the latter's movement to exposed or extended position in which the article or articles are readily accessible and can be removed from the compartment. The receptacle preferably further comprises a cover which is detachably coupled with the housing to normally overlie the open side of the chamber. The housing and the cover may constitute the pistol grip of a motion picture camera.

The novel features which are considered as characteristic of the invention are set forth in particular in the appended claims. The improved receptacle itself, however, both as to its construction and its mode of operation, together with additional features and advantages thereof, will be best understood upon perusal of the following detailed description of a specific embodiment with reference to the accompanying drawing.

BRIEF DESCRIPTION OF THE DRAWING

FIG. 1 is a perspective view of a receptacle for four batteries which forms part of the pistol grip of a motion picture camera and wherein the cover of the pistol grip is shown in open or removed position and the holder for four batteries in partially withdrawn or exposed position;

FIG. 2 is a fragmentary smaller-scale front elevational view of the camera with the pistol grip shown in partial transverse vertical section;

FIG. 3 is a plan view of the holder as seen in the direction of the arrow III in FIG. 2; and FIG. 4 is an end elevational view of the holder, with a stack of four batteries held by its clamping members, as viewed in the direction of the arrow IV in FIG. 3.

DESCRIPTION OF THE PREFERRED EMBODIMENT

Referring first to FIGS. 1 and 2, there is shown a portion of an 8-millimeter motion picture camera having a body 1 and a pistol grip which constitutes the improved receptacle for a stack of four cylindrical batteries 8. The trigger of the camera is shown at 20. The receptacle or pistol grip comprises a substantially trough-shaped housing 2 having a bottom wall 2a and two side walls 2b, 2c which flank the bottom wall 2a and define therewith a chamber 4 extending inwardly from the open side of the housing, i.e., the bottom wall 2a is remote from the open side. A cover 3 of the pistol grip can be placed over the open side of the housing 2 and can be detachably connected thereto so that the operator can gain access to the chamber 4. In the illustrated embodiment, the end wall 3a of the cover 3 has two openings 6 which can receive projections 5 provided on a bracket 5a which is mounted in the chamber 4 adjacent to the end wall 2d of the housing 2. A screw 7 or a like fastener couples the other end of the cover 3 to the housing 2 or to a portion of the camera body 1. It is clear that the parts 5a, 3a and 7 can be replaced by other readily separable connecting means for the cover 3.

The chamber 4 fully accommodates two of the four batteries 8. These batteries are received and held in a compartment between two arcuate clamping members 12b which are rigid with a flat elongated base or web 12 of a holder H. One end portion of the base 12 is provided with two mirror symmetrical recesses or notches 12a to form between the notches a narrow neck 12A which is turnable between and is straddled by two arms 11a, 11b of a flat plate or panel 11 constituting a pivot for the holder H. The arms 11a, 11b define a slot 11c for the neck 12A. The plate 11 preferably consists of insulating material and is permanently or detachably installed in the chamber 4 adjacent to the bracket 5a. The chamber 4 further accommodates two electric contacts or tongues 9, 10 which engage with the poles of the batteries 8 and are electrically connected with the current consuming part or parts of the motion picture camera, for example, with an electric motor which drives the film transporting mechanism and the shutter. The contacts 9, 10 are positioned in such a way that they connect the opposite poles of two adjoining batteries 8. The contact 10 is secured to the plate 11 by a rivet 14 or the like. The contact 9 is installed in the chamber 4 at a point which is remote from the end wall 2d of the housing 2.

The clamping members 12b of the holder H are mirror symmetrical with reference to each other (see FIGS. 3 and 4) and their inner end portions 12c which are adjacent to the base 12 are in frictional engagement with the side walls 2b, 2c, at least in fully inserted position of the holder to prevent wobbling and to yieldably retain the holder H in inserted position. The outer end portions 12e of the clamping members 12b extend from the chamber 4 in inserted position of the holder H so that they can be grasped by two fingers in order to move the holder to exposed position shown in FIG. 1 in which the batteries 8 can be readily withdrawn from the compartment between the clamping members. FIG. 2 shows the holder H in fully inserted position and the cover 3 in closed position in which the open side of the housing 2 is sealed. In order to move the holder H to exposed or extended position, the operator removes the screw 7 and withdraws the projections 5 from the respective openings 6 so that the cover 3 can be separated from the housing 2. In the next step, the operator grasps the outer end portions 12e of the clamping members 12b and pivots the entire holder H in the direction indicated in FIG. 2 by arrow 13. The neck 12A then pivots in the slot 11c between the arms 11a, 11b of the plate 11. The clamping members 12b can be provided with ribs 12d or like stiffeners. The configuration of these clamping members is preferably such that their inner end portions 12c remain in continuous frictional engagement with the side walls 2b, 2c, i.e., even at the time when the holder H is moved to the exposed position shown in FIG. 1.

FIG. 2 shows that, when the holder H is moved to inserted position, the base 12 lies flat against the bottom wall 2a of the housing 2 and is fully accommodated in the chamber 4. Two batteries 8 which are immediately adjacent to the base 12 are also accommodated in the chamber 4 and the other two batteries are accommodated in the interior of the cover 3 which is preferably similar to the housing 2. When moved to exposed position shown in FIG. 1, the holder H allows for rapid removal of all four batteries 8 from the compartment between the clamping members 12b. The two outer batteries (i.e., the two left-hand batteries, as viewed in FIG. 2) are removed first and the two inner batteries in the next step. When the batteries are replaced by fresh batteries, the user simply applies finger pressure against the fresh batteries or against the clamping members 12b to return the entire holder H to the inserted position shown in FIG. 2. The cover 3 is then reattached to the housing 2 and the camera is ready for use.

An important advantage of our receptacle is that the holder H is not rigidly mounted in the housing 2 so that it can be readily swung between inserted and exposed positions. Such pivotal movements of the holder H can be effected without resorting to shafts, complicated bearings or like costly parts. It is further clear that the receptacle can be modified in a number of ways without departing from the spirit of the present invention. For example, the housing 2 and cover 3 need not consititute a pistol grip but may form parts of the camera body 1 proper, i.e., the invention can be embodied in motion picture cameras without pistol grips. Furthermore, the plate 11 need not serve as a support for the contact 10 but may constitute a portion of the bracket 5a or of a wall of the housing 2. Still further, the receptacle is equally useful for storage of one, two, three, five or more batteries or other types of substantially rod-shaped articles which should be mounted in a way to enable the operator or user to gain access without resorting to complicated tools and by exertion of a small effort. The housing 2 and cover 3 preferably consist of lightweight synthetic plastic material and the entire holder H preferably consists of a single piece of springy metallic material, for example, spring steel. If desired, the holder H may comprise two or more pairs of clamping members and such clamping members can be welded, riveted or otherwise affixed to the base 12. Also, it often suffices if only one of each pair of clamping members consists of springy material or if only one of these clamping members comprises an outer end portion 12e.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

I claim:

1. A receptacle for storage of substantially rod-shaped articles, particularly for storage of cylindrical batteries in motion picture cameras, comprising a housing having an open side and a chamber extending inwardly from said open side; a holder including an elongated base and a pair of clamping members rigid with said base and defining a compartment for at least one rod-shaped article, at least one of said clamping members consisting of elastomeric material and being arranged to yieldably hold the article in said compartment; and coupling means comprising cooperating coupling portions provided on said base and in said housing to permit movement of said holder lengthwise and transversely of said base between an inserted position in which said base is accomodated in said chamber and an exposed position in which the article in said compartment is readily accessible.

2. A receptacle as defined in claim 1, wherein at least one of said clamping members comprises a portion which extends from said chamber in inserted position of said holder to facilitate movement of the holder to exposed position in which the article is readily removable from said compartment.

3. A receptacle as defined in claim 2, wherein said housing comprises a bottom wall remote from said open side and a pair of spaced side walls flanking said bottom wall, said base being adjacent to said bottom wall in inserted position of said holder.

4. A receptacle as defined in claim 3, wherein said base is substantially flat.

5. A receptacle as defined in claim 3, wherein said clamping members comprise retaining portions in frictional engagement with said side walls, at least in inserted position of said holder.

6. A receptable as defined in claim 1, wherein said holder consists of a single piece of elastomeric material.

7. A receptacle as defined in claim 1, wherein said compartment is dimensioned to accommodate a stack consisting of several rod-shaped batteries.

8. A receptacle as defined in claim 1, wherein said housing consists of synthetic plastic material and said holder consists of springy metallic material.

9. A receptacle for storage of substantially rod-shaped articles, particularly for storage of cylindrical batteries in motion picture cameras, comprising a housing having an open side and a chamber extending inwardly from said open side; a pivot portion provided in said housing; and a holder including a base having an end portion, one of said portions including a neck and the other of said portions including two arms straddling said neck so that said base is turnably coupled to said pivot portion to permit movement of said holder between an inserted position in which said base is accommodated in said chamber and an exposed position, and a pair of clamping members rigid with said base and defining a compartment for at least one rod-shaped article, at least one of said clamping members consisting of elastomeric material and being arranged to engage and to yieldably hold the article in said compartment.

10. A receptacle as defined in claim 9, wherein said pivot portion comprises a panel inserted into said chamber 11. A receptacle as defined in claim 9, wherein said housing constitutes a portion of a camera body and further comprising removable cover means normally overlying the open side of said housing.

12. A receptacle as defined in claim 11, wherein said housing and said cover means together constitute the pistol grip of a motion picture camera.

13. A receptacle as defined in claim 9, wherein said clamping members are remote from said end portion and are substantially mirror symmetrical with reference to each other